Dec. 30, 1958          R. W. TUTHILL                2,866,888
                         ARC WELDING
                       Filed Aug. 3, 1955
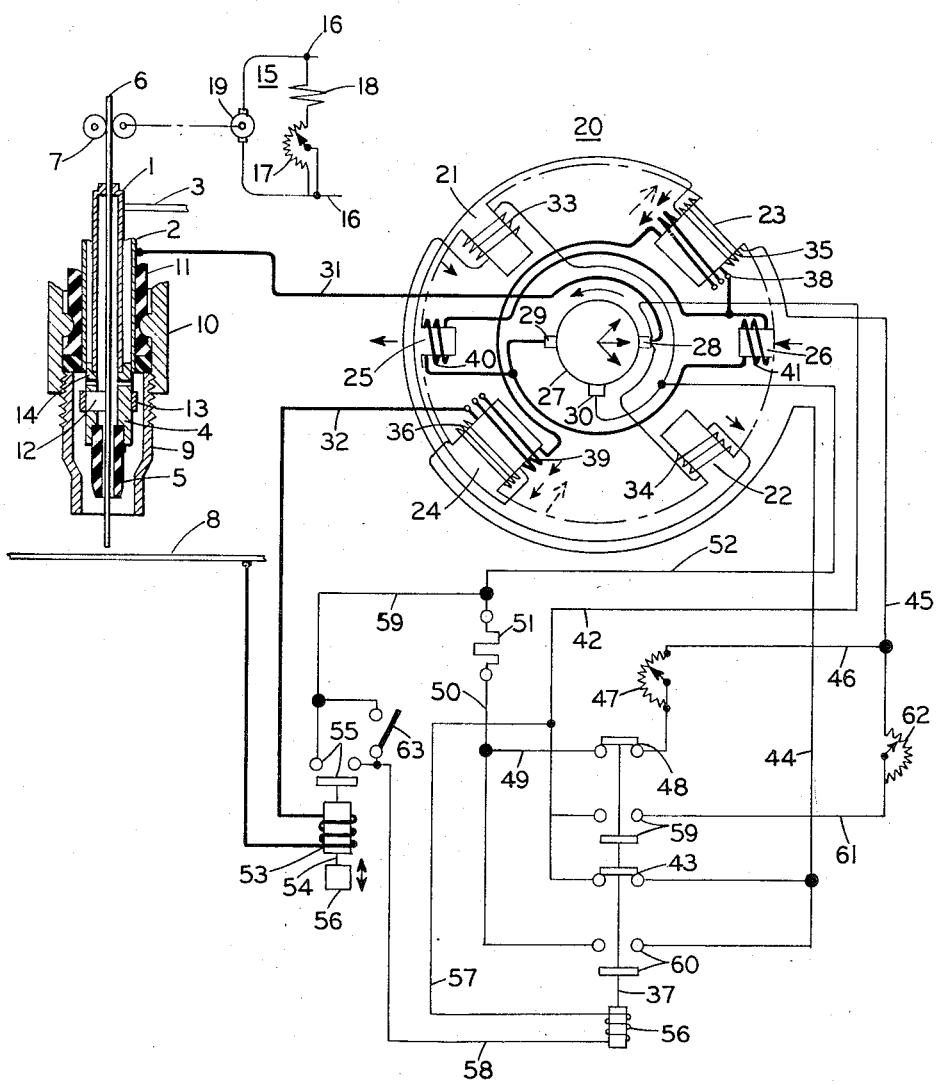
Inventor:
Roger W. Tuthill
by, Richard E. Hosley
His Attorney

United States Patent Office 2,866,888
Patented Dec. 30, 1958

2,866,888

ARC WELDING

Roger W. Tuthill, York, Pa., assignor, by mesne assignments, to Air Reduction Company, Incorporated, New York, N. Y., a corporation of New York Application August 3, 1955, Serial No. 526,137

10 Claims. (Cl. 219—135)

My invention relates to metal arc welding at current densities sufficiently high to produce a self-regulating arc and more particularly to apparatus which facilitates arc striking when employing a welding current source of supply having a rising volt-ampere characteristic substantially the same as the rising volt-ampere characteristic of a self-regulating arc. This type of welding is usually performed in an inert gaseous medium such as argon, helium or mixtures thereof although other gases, liquids and granular or powdered solids may be used as the arc shielding medium.

To secure the desired high current densities for this kind of welding, the electrode is usually less than 1/8 of an inch in diameter when using welding current sources of conventional size. Current densities of from 40,000 to 280,000 amperes per square inch or higher are used for electrodes of from .020 to .125 inch in diameter. This high current density in the electrode results in a very rapid consumption thereof and consequently the electrode must be fed at a high rate of speed to match its consumption in the arc. Electrode feeding speeds of from 100 to 1000 inches per minute are commonly required.

Consumption of the electrode in this type of arc welding is almost directly proportional to the welding current and is not very sensitive to arc voltage. The inherent self-regulation of the welding arc in this process of welding makes it essentially automatic and eliminates controls for varying the speed of the electrode feed in accordance with a characteristic of the arc such as its current or voltage.

A high current density self-regulating arc has a rising volt-ampere characteristic and if the welding current source of supply also has a rising volt-ampere characteristic, as evidenced at the electrode and the work, the welding operation is greatly simplified. With such a source of supply, the welding current and heat in the arc can be adjusted by simply adjusting the speed at which the electrode is fed toward the work. Furthermore the arc length can be independently adjusted for a given electrode size by simply adjusting the voltage of the source which will adjust the voltage level to the various volt-ampere curves for arcs of different lengths for operation along a selected one of these curves. The slope of the volt-ampere curve is of course controlled so as to have substantially the same slope as the volt-ampere characteristic of the welding arc. Segregation of the control into its functions of one control for arc length and one control for current and metal deposition rate, the latter being only an adjustment of the electrode feed speed, makes the welding operation very simple and practically foolproof. With a welding current source having this rising volt-ampere characteristic, the arc length is no longer sensitive to variations of welding current or electrode feed speed such as occur when using a welding current source of supply having a drooping volt-ampere characteristic or having an output voltage which is substantially constant regardless of the arc load requirements.

Automatic and semi-automatic apparatus for practicing this method of welding usually embodies some means for feeding the electrode toward the work at a substantially constant rate of speed. The operator usually initiates the welding operation by energizing the electrode feeding means to advance the electrode to the work and upon engagement of the electrode with the work the end of the electrode is fused and falls away producing the welding arc between the end of the electrode and the work without interrupting the forward feed of the electrode. With such apparatus difficulty has sometimes been experienced in striking a self-regulating arc supplied from a welding current source having the desired rising volt-ampere characteristic above-noted, and the greatest difficulty has been experienced when using electrodes having a low thermal and electrical conductive capacity such as electrodes of stainless steel or mild steel. It is possible to eliminate this difficulty by touching the end of the electrode to the work and withdrawing it to establish the arc at its terminal before initiating the electrode feed but this method of starting is not satisfactory for fully automatic operation and in the case of semi-automatic welding requires a skill in operation which it is desired to eliminate.

It is an object of my invention to provide arc welding apparatus for a high current density self-regulating arc in which the operating arc length may be pre-adjusted and in which the current and voltage conditions at the time of striking the arc are such that the arc is readily established between the electrode and the work by fusing off the end of the electrode which is being fed to the work at a preselected rate of speed.

Further objects of my invention will become apparent from the following description of one embodiment thereof.

In practicing my invention welding current is supplied to the electrode and the work at current densities in the electrode sufficiently high to produce a self-regulating arc from a source of supply or power source having a rising volt-ampere characteristic substantially the same as the rising volt-ampere characteristic of this self-regulating arc and a fusible metal electrode is fed to the work at a substantially constant rate of speed to strike the arc and thereafter maintain it. The source of supply is provided with means for setting its voltage for operation on a volt-ampere characteristic corresponding to the volt-ampere characteristic of a self-regulating arc of the desired length and means are also provided for setting the open circuit voltage of this source of supply for establishing an arc voltage across a gap between the electrode and the work which is greater in length than the arc length capable of being established by the first-mentioned voltage setting means and which in itself is capable of establishing an arc by fusing off the end of the electrode as it is being fed to the work. The welding operation is initiated when the source of supply is under the control of the last-mentioned voltage setting means and means responsive to the flow of welding current is employed for switching from the last-mentioned voltage setting means to the first-mentioned voltage setting means after a predetermined time interval which is sufficient for establishing an arc between the end of the electrode and the work by fusing off the end portion thereof while maintaining its feeding rate previously established by the electrode feeding means. Means may also be provided for reversely switching these voltage setting means after a predetermined time delay following an interruption of welding current flow in order to facilitate re-striking an arc when it has been extinguished for a sufficient length of time so that the arcing terminal thereof is no longer in a highly heated state as it is after a momentary interruption during the progress of a continuous welding operation.

When employing an electrode having difficult arc starting characteristics such as those referred to above, the starting surge of current through the electrode at the time it engages the work builds up slowly because the welding current source must have a low open circuit voltage in order to provide the desired operating voltage commensurate with the voltage of a welding arc of the desired operating length. Control of the operating length is important in that it controls arc penetration, short arcs producing more penetration than long arcs. Also for welding in certain shielding atmospheres, such as carbon dioxide it is desirable to operate with a short arc in order to prevent excessive weld spatter. Furthermore in an electrode having difficult arc striking characteristics, the build up of heat is not concentrated at its contact with the work as when using electrodes having higher thermal and electrical conductive capacities but is built up throughout the length of the uncooled terminal end portion of the electrode through which the welding current flows with the result that when fusion takes place a substantial length of the electrode is melted away to produce an arc gap which may be of from ⅜ to ¾ inch long. When this happens, the voltage of the source of supply must be sufficient to maintain the arc until the electrode is fed toward the work a sufficient amount in order to decrease this arc gap. The arc striking operation is further complicated in certain types of apparatus because the welding current is retarded by the inherent inductance of the welding current system so that at the time of fusion of the end portion of the electrode the voltage of the source is not enough to keep the arc going. The arc consequently goes out and several attempts at starting the arc by feeding the electrode toward the work may be required before an arc is finally established under conditions when the amount of metal fused from the end of the electrode produces an arc gap commensurate with the source voltage at that time. By employing the high voltage and high current starting arrangement of my invention sufficient current and voltage is initially available to strike the arc and after a short time delay period the voltage of the source is automatically adjusted to a preset value which is determinative of the desired operating length of the welding arc.

The features of my invention which I believe to be novel are set forth with particularity in the appended claims. One embodiment of my invention has been illustrated in the accompanying drawing the single figure of which is a more or less diagrammatic representation of the apparatus employed in such embodiment.

In the embodiment of my invention shown in the drawing, a fusible metallic electrode is fed to the work at a substantially constant rate of speed through a welding tool by means of which a shielding gas is also supplied about the arcing terminal of the electrode and the work rendered molten by the arc. Welding current is supplied to the electrode and the work from a cumulatively compound generator having, as evidenced at the electrode and the work, a rising volt-ampere characteristic corresponding to that of the arc. The particular generator employed in the embodiment shown is a split pole generator having leading and trailing pole pieces for generating voltages in the armature of the welding generator between a pair of main brushes and an auxiliary brush located therebetween. The voltage between the main brushes in the algebraic sum of the substantially constant voltage between one main brush and the auxiliary brush induced by the trailing or main pole pieces and a variable voltage between the other main brush and the auxiliary brush induced by the flux in the leading or cross pole pieces. The leading and trailing pole pieces are provided with shunt windings which are excited by the substantially constant voltage between the auxiliary brush and the trailing main brush. The leading pole pieces are also provided with series windings and means are provided for controlling the number of these windings connected in the welding circuit in order to control the slope of the volt-ampere characteristic of the generator. In order to obtain the low open circuit voltage necessary for attaining the desired operating arc voltage, the shunt field windings on the leading pole pieces are normally connected differentially with regard to the shunt field windings on the trailing pole pieces and the series field windings on the leading pole pieces.

In accordance with the illustrated embodiment of my invention, means are provided for controllably reversing the connection of the shunt field windings on the leading pole pieces. This means comprises a reversing relay having contacts connected in circuit with these shunt field windings for accomplishing this purpose. Rheostats are also provided for independently adjusting the magnitude of current flow through these shunt field windings under starting and normal operating conditions of the generator. This reversing relay is moved from one of its operating positions to its other operating position under the control of a current relay having its operating winding connected in the welding circuit. In one of its operating positions the current relay energizes the operating winding of the reversing relay by connecting it across the constant potential between the auxiliary and a trailing load brush of the generator and in its other operating position it opens this circuit. In its de-energized position the reversing relay completes connections through its contacts for connecting the shunt field winding the leading pole pieces of the generator cumulatively with the other windings of the generator and after a predetermined time delay period the welding current relay energizes this reversing relay to operate it to its other position in which this field winding is connected differentially with the other field windings of the generator for normal operation thereof. A hand operated switch is provided for independently controlling the energization of the winding of the reversing relay so that the high voltage and current starting conditions may be eliminated when welding with certain electrodes. The arrangement thus generally described will now be described in greater detail.

The welding tool shown in the drawing comprises an electrode guide formed by contrically spaced tubes 1 and 2. A conduit 3 enters the upper end of tube 1 for supplying shielding gas thereto. The lower ends of tubes 1 and 2 terminate in an adapter 4 which closes the space between the inner and outer tubes and provides a continuation of the electrode and gas passageway in tube 2. A socket in the lower end of adapter 4 provides a support for a replaceable tip 5. The fusible metal electrode 6 is propelled by feed rolls 7 into and through tube 1, adapter 4 and tip 5 in its passage through the tool toward the work 8. The adapter 4 and tip 5 are enclosed within a nozzle 9 which is supported on the lower end of a sleeve 10 which frictionally engages and is supported by a resilient sleeve 11 which in turn frictionally engages and is supported by the lower end of tube 2 of the electrode guide. Tubes 1 and 2 of the electrode guide and two longitudinal partitions therebetween form supply and exhaust passageways for cooling fluid which is circulated between sleeves 10 and 11 through matching holes in the lower end of tube 2 and sleeve 11. Welding current is supplied to electrode 6 through a brush 12 which is supported in adapter 4 and spring-biased into engagement with the electrode by a spring ring 13. Brush 12, adapter 4 and tubes 1 and 2 are formed of metal which is a good electrical conductor and one terminal of the welding generator is connected at a suitable point to tube 2 for supplying welding current to brush 12 and thence to electrode 6. Gas supplied to the inner tube 1 of the electrode guide passes through this tube to discharge passages 14 in the adapter 4 and into the upper end of the chamber formed by nozzle 9. This gas is discharged through the open end of nozzle 9 to form a shield about the arcing terminal of the electrode and the molten metal in the work 8 formed by the welding arc.

As shown in the drawing the work 8 is connected to the other terminal of the welding generator.

The electrode 6 is fed through the welding tool at a substantially constant high rate of speed by means of a feed motor 15. As illustrated, this motor is a direct current shunt motor having its input terminals conneced to a suitable source of direct current 16. The speed of this motor can be set or adjusted by adjusting a rheostat 17 in circuit with its shunt field 18. The armature 19 of this motor is mechanically connected to one or both of the feed rolls 7 of the welding tool which engage and propel the electrode 6 through the welding tool.

The welding generator 20 is of the split pole type illustrated and described in U. S. Letters Patent 1,350,004, Sven R. Bergman, for Dynamo Electric Machine granted on May 11, 1920. The winding arrangement herein employed has been modified however from that shown in this patent in order to obtain the desired rising volt-ampere charactertic above described.

As shown in the drawing, the magnet frame of the generator is provided with main pole pieces of opposite polarity 21 and 22, cross pole pieces of opposite polarity 23 and 24 and commutating pole pieces 25 and 26. Its main and cross pole pieces of like polarity constitute a polar structure split into trailing and leading parts and accounts for its type name. The armature winding of this generator terminates in a commutator 27 having thereon main brushes 28 and 29 and an auxiliary brush 30 located between these main brushes. One main brush 28 is connected to the electrode 6 through a conductor 31 and the other main brush 29 is connected through the series field windings of the generator and a conductor 32 to the work 8. The welding conductors 31 and 32 are of the usual type and for the lengths employed usually impose no more than 1 to 5 volt resistance drop in the welding circuit. Consequently, the volt-ampere adjustment of the generator must be at the 1 to 5 volts higher value than that required by the volt-ampere characteristic of the welding arc.

The main pole pieces 21 and 22 of the generator are provided with shunt field windings 33 and 34 which are connected in series with one another across main brush 28 and auxiliary brush 30. These windings provide a saturating flux in the main pole pieces so that armature reaction produces very little, if any, change in the field strength thereof acting through the portion of the armature between brushes 28 and 30. The cross pole pieces 23 and 24 are provided with shunt field windings 35 and 36 which are connected in series with one another through the contacts of reversing relay 37 and circuits including these contacts in a manner described below. These cross pole pieces 23 and 24 are also provided with series field windings 38 and 39 which are connected in series with one another and in series with the parallel connected series windings 40 and 41 on the commutating pole piece 25 and 26. The series field windings are provided with taps as indicated so as to provide operating characteristics of different slopes depending upon the requirements of the welding arc. It will also be noted that the cross pole pieces 23 and 24 have been illustrated as having larger dimensions than the main pole pieces 21 and 22. This is to provide for operation of the cross pole pieces at flux values less than saturation.

The shunt field windings on the leading or cross pole pieces 23 and 24 are connected across brushes 28 and 30 of the generator through a circuit including conductor 42, contacts 43 of relay 37, conductors 44, 45 and 46, rheostat 47, contacts 48 of relay 37, conductors 49 and 50, a protective resistor 51 and a conductor 52. Thus in the de-energized or biased position of relay 37 the shunt field windings 35 and 36 on the cross pole pieces 23 and 24 are connected cumulatively with the series windings on these pole pieces and with the shunt field windings 33 and 34 on the main pole pieces 21 and 22. The directions of the fluxes thus produced is indicated by the solid arrows applied along one side of these field windings. This connection produces a high open circuit voltage of from 25 to 40 volts which is determined by the adjustment of rheostat 47.

Upon the flow of welding current the operating winding 53 of a current relay 54 is energized to complete a circuit through its contacts 55 after a time delay period determined by its dash pot 56 or a similar time delay means forming part thereof or associated therewith. The closing of contacts 55 of this relay completes the energizing circuit for the operating winding 56 of the reversing relay 37 across brushes 28 and 30 of the generator through conductors 42, 57, 58, 59 and 52. When the relay 37 is thus energized, it reverses the connection of the shunt field windings 35 and 36 by opening its contacts 43 and 48 and closing its contacts 59 and 60. The circuit completed through contacts 59 and 60 is as follows: From brush 28 through conductor 42, contacts 59, conductor 61, rheostat 62, conductors 45 and 44, contacts 60 of relay 37, conductor 50, protective resistor 51, and conductor 52. This completes the normal operating connection of the shunt field windings 35 and 36 whose excitation is adjusted by means of rheostat 62 which is set to obtain the desired voltage level for operating with an arc of the desired length. This adjustment produces an open circuit voltage of from 12 to 22 volts which will provide the desired operating arc voltage at higher values depending on the slope and voltage level of the volt-ampere characteristic of an arc of the desired length. The direction of the normal operating flux of these windings has been illustrated in the drawing by the dotted arrows applied along one side thereof. The protective resistor 51 is used to prevent a short circuit connection across brushes 28 and 30 of the generator should arcing occur at contacts 43 and 60 of the relay during the switching operation.

A manual switch 63 for completing a circuit across contacts 55 of relay 54 is also provided so that the switching operation of relay 37 may be eliminated when using electrodes which do not require the high voltage and current starting provided by operation of this relay. Furthermore a time delay means 56 associated with relay 54 may be provided for imposing a time delay in each direction of operation of relay 54 so that during a welding operation a momentary interruption of the welding will not re-impose the high voltage and current starting condition which is not then needed because the end of the electrode is in a highly heated state and arc starting can be accomplished by using the normal operating characteristic of the generator. However, if the interruption of the arc is for any substantial period of time, then relay 54 will drop after the time delay and re-impose the starting conditions above described.

It is of course apparent that practicing of my invention is not limited to the use of the split pole type of generator and its control above described since any other cumulatively compound generator with means for controlling its starting and operating characteristics in accordance with my above disclosure may be employed. Furthermore the electrode may be operated either at positive polarity as illustrated in the arrangement above described or at negative polarity. The welder need not be of the rotating dynamo electric type since static sources of supply, such as rectifier welders, may be used. Other changes and modifications will occur to those skilled in the art.

It has heretofore been proposed to provide means for increasing the voltage of a drooping current source of supply when initiating a low current density arc supplied therefrom but this was resorted to in order to establish the arc from the sparking contact initiated by touching an electrode to dirty or rusty work and then withdrawing it to start the welding operation. When using a rising volt-ampere characteristic source for supplying a high current density self-operating arc as above described, different conditions are encountered and the increase of starting voltage and current provided by applicant's system operates in a different manner to accomplish a different result.

While I have described the illustrated embodiment of my invention as applied to shielded inert gas metal arc welding it is to be understood that it may be applied to any form of metal arc welding wherein the arc has the above described self-regulating or self-compensatory action. Modifications and adaptations of my invention will readily occur to those skilled in the art, and it is consequently my intention to cover all such changes and modifications which come within the true spirit and scope of my invention.

What I claim as new and desire to secure by Letters Patent of the United States is:

1. Apparatus for metal arc welding with current densities productive of a self-regulating arc having a rising volt-ampere characteristic determined by its length, said apparatus comprising means for feeding an electrode toward the work at a substantially constant rate of speed, means for adjusting said substantially constant feeding rate of said last-mentioned means, means, including a power source, for supplying welding current to the electrode and the work, said power source being capable of supplying welding current to said electrode and the work to be welded at current densities in said electrode sufficiently high to produce a self-regulating arc and having a rising volt-ampere characteristic substantially the same as the rising volt-ampere characteristic of said self-regulating arc, means for setting the voltage of said power source for operation on a volt-ampere characteristic corresponding to the volt-ampere characteristic of a self-regulating arc of desired length, and means for establishing an arc between the end of the electrode and the work by fusing off the end of the electrode while maintaining its feeding rate by said electrode feeding means, said means including means for setting the open circuit voltage of said power source for establishing an arc voltage across a gap between the electrode and the work which is greater in length than the arc length capable of being established by said first-mentioned voltage setting means, and means responsive to the flow of welding current for switching the control of said power source from said last-mentioned voltage setting means to said first-mentioned voltage setting means after a predetermined time delay.

2. Apparatus for metal arc welding with current densities productive of a self-regulating arc having a rising volt-ampere characteristic determined by its length, said apparatus comprising means for feeding an electrode toward the work at a substantially constant rate of speed, means for adjusting said substantially constant feeding rate of said last-mentioned means, means including a power source, for supplying welding current to the electrode and the work, said power source being capable of supplying welding current to said electrode and the work to be welded at current densities in said electrode sufficiently high to produce a self-regulating arc and having a rising volt-ampere characteristic substantially the same as the rising volt-ampere characteristic of said self-regulating arc, means for setting the voltage of said power source for operation on a volt-ampere characteristic corresponding to the volt-ampere characteristic of a self-regulating arc of desired length, and means for establishing an arc between the end of the electrode and the work by fusing off the end of the electrode while maintaining its feeding rate by said electrode feeding means, said means including means for setting the open circuit voltage of said power source for establishing an arc voltage across a gap between the electrode and the work which is greater in length than the arc length capable of being established by said first-mentioned voltage setting means, and means responsive to the flow of welding current for switching the control of said power source from said last-mentioned voltage setting means to said first-mentioned voltage setting means after a predetermined time delay and for reversely switching the control of said power source from said first-mentioned voltage setting means to said second-mentioned voltage setting means after a predetermined time delay following an interruption of welding current flow.

3. Arc welding apparatus for metal arc welding with current densities productive of a self-regulating arc having a rising volt-ampere characteristic determined by its length, said apparatus comprising means for feeding an electrode toward the work at a substantially constant rate of speed, means for adjusting said substantially constant feeding rate of said last-mentioned means, means including a generator, for supplying welding current to the electrode and the work, said generator being capable of supplying welding current to said electrode and the work at current densities in said electrode sufficiently high to produce a self-regulating arc and having a rising volt-ampere characteristic substantially the same as the rising volt-ampere characteristic of said self-regulating arc, switching means for controlling the excitation of said generator, said switching means having a position in which it completes a circuit which sets the voltage of said generator for operation on a volt-ampere characteristic corresponding to the volt-ampere characteristic of a self-regulating arc of desired length and also having a position in which it completes a circuit which sets the open circuit voltage of said generator for establishing an arc across a gap between the electrode and the work which is greater in length than the arc length capable of being established when said switching means is in its other position, and time delay means responsive to the flow of welding current supplied by said generator for operating said switching means from one to the other of its said circuit completing positions.

4. Arc welding apparatus for metal arc welding with current densities productive of a self-regulating arc having a rising volt-ampere characteristic determined by its length, said apparatus comprising means for feeding an electrode toward the work at a substantially constant rate of speed, means for adjusting said substantially constant feeding rate of said last-mentioned means, means, including a generator, for supplying welding current to the electrode and the work, said generator being capable of supplying welding current to said electrode and the work at current densities in said electrode sufficiently high to produce a self-regulating arc and having a rising volt-ampere characteristic substantially the same as the rising volt-ampere characteristic of said self-regulating arc, switching means for controlling the excitation of said generator, said switching means being operable to a position which completes a circuit which sets the voltage of said generator for operation on a volt-ampere characteristic corresponding to the volt-ampere characteristic of a self-regulating arc of desired length and being biased to a position which completes a circuit which sets the open circuit voltage of said generator for establishing an arc across a gap between the electrode and the work which is greater in length than the arc length capable of being established when said switching means is in its other position, time delay means responsive to the flow of welding current supplied by said generator for operating said switching means from its biased position to its other position, and manual means for operating said switching means from its biased position to its other position independently of the controlling action of said last-mentioned means.

5. Apparatus for metal arc welding with current densities productive of a self-regulating arc having a rising volt-ampere characteristic determined by its length, said apparatus comprising means for feeding an electrode toward the work at a substantially constant rate of speed, means for adjusting said substantially constant feeding rate of said last-mentioned means, means, including a generator, for supplying welding current to the electrode and the work, said generator being capable of supplying welding current to said electrode and the work at current densities in said electrode sufficiently high to produce a self-regulating arc and having a rising volt-ampere characteristic substantially the same as the rising volt-ampere characteristic of said self-regulating arc, switching means for controlling the excitation of said generator, said switching means being operable to a position which completes a circuit which sets the voltage of said generator for operation on a volt-ampere characteristic corresponding to the volt-ampere characteristic of a self-regulating arc of desired length and being biased to a position which completes a circuit which sets the open circuit voltage of said generator for establishing an arc across a gap between the electrode and the work which is greater in length than the arc length capable of being established when said switching means is in its other position, and means responsive to the flow of welding current supplied by said generator for operating said switching means and for imposing a time delay in the operation thereof to and from its biased position.

6. Apparatus for metal arc welding with current densities productive of a self-regulating arc having a rising volt-ampere characteristic determined by its length, said apparatus comprising means for feeding an electrode toward the work at a substantially constant rate of speed, means for adjusting said substantially constant feeding rate of said last-mentioned means, means, including a generator, for supplying welding current to the electrode and the work, said generator being capable of supplying welding current to said electrode and the work at current densities in said electrode sufficiently high to produce at its arcing terminal a self-regulating arc and having a rising volt-ampere characteristic substantially the same as the rising volt-ampere characteristic of said self-regulating arc, said generator having an armature winding and a commutator therefor, leading and trailing load brushes engaging said commutator, an auxiliary brush engaging said commutator intermediate said load brushes, a magnet frame having pole pieces of opposite polarity operating at magnetic saturation and having main field windings thereon for producing substantially constant magnetic flux and voltage in said armature between said trailing load brush and said auxiliary brush and also having pole pieces of opposite polarity normally operating below magnetic saturation and having cross field windings and series windings thereon for producing a variable magnetic flux and voltage in said armature between said auxiliary brush and said leading load brush, exciting circuits for said main and cross field windings connected across said trailing load brush and said auxiliary brush, and an exciting circuit for said series windings connected in circuit with said load brushes, said exciting circuits being connected for supplying current through said windings in a direction to produce in each winding and its pole piece magnetic fluxes which are cumulative and in the same direction through said armature of said generator, means responsive to the flow of welding current for reversing after a predetermined time interval the direction of current flow through said cross field windings, and means for independently adjusting the magnitude of the forward and reverse current flow in said cross field windings.

7. Apparatus for metal arc welding with current densities productive of a self-regulating arc having a rising volt-ampere characteristic determined by its length, said apparatus comprising means for feeding an electrode toward the work at a substantially constant rate of speed, means for adjusting said substantially constant feeding rate of said last-mentioned means, means, including a generator, for supplying welding current to the electrode and the work, said generator being capable of supplying welding current to said electrode at current densities in said electrode sufficiently high to produce at its arcing terminal a self-regulating arc and having a rising volt-ampere characteristic substantially the same as the rising volt-ampere characteristic of said self-regulating arc, said generator having an armature winding and a commutator therefor, leading and trailing load brushes engaging said commutator, an auxiliary brush engaging said commutator intermediate said load brushes, a magnet frame having one pole piece operating at magnetic saturation and having a main field winding thereon for producing magnetic flux and voltage between said trailing load brush and said auxiliary brush and another pole piece normally operating below magnetic saturation and having a cross field winding and a series winding thereon for producing flux and voltage between said auxiliary brush and said leading load brush, exciting circuits for said main and cross field windings connected across said trailing load brush and said auxiliary brush, an exciting circuit for said series winding connected in circuit with said load brushes, said exciting circuits being connected for supplying current through said windings in a direction to produce in each winding and its pole piece magnetic fluxes which are cumulative and in the same direction through said armature of said generator, means responsive to the flow of welding current for reversing after a predetermined time interval the direction of current flow through said cross field winding and for restoring the original direction of current flow in said winding a predetermined time interval after welding current flow ceases, means for adjusting the magnitude of the reverse current flow in said cross field of winding, and means for selecting the number of turns of said series winding connected in circuit with said load brushes.

8. Arc welding apparatus comprising means for feeding an electrode toward the work at a substantially constant rate of speed, means for adjusting said substantially constant feeding rate of said last-mentioned means, means including a generator, for supplying welding current to the electrode and the work, said generator being capable of supplying welding current to said electrode at densities sufficiently high to produce at its arcing terminal a self-regulating arc and having a rising volt-ampere characteristic substantially the same as the rising volt-ampere characteristic of said self-regulating arc, said generator having an armature winding and a commutator therefor, leading and trailing load brushes engaging said commutator, an auxiliary brush engaging said commutator intermediate said load brushes, a magnet frame having a pole piece structure split into leading and trailing parts, said trailing part operating at magnetic saturation for producing a substantially constant voltage in said armature between said auxiliary brush and said trailing load brush and said leading part normally operating below magnetic saturation for producing a voltage variable in amount and direction in said armature between said leading load brush and said auxiliary brush, shunt field windings individual to each part of said split pole piece structure and having individual exciting circuits connected between said trailing load brush and said auxiliary brush, a series field winding on the leading part of said split pole piece structure and having an exciting circuit including a selected number of turns of said winding connected in series with said load brushes, said series winding producing in the leading part of said split pole piece structure magnetic flux which has the same direction therethrough as the magnetic flux produced in said trailing part of said split pole piece structure by the shunt winding thereon, switching means for reversing the direction of exciting current flow in said exciting circuit of said shunt winding on said leading part of said split pole piece structure, means for biasing said switching means to a position producing excitation of said shunt winding on said leading part on said split pole piece structure which is in a direction to produce magnetic flux therein which is cumulative with the magnetic flux produced therein by said series field winding thereon, means responsive to the flow of welding current supplied by said generator for operating said switching means after a predetermined time delay and for returning said switching means to its biased position after a predetermined time delay following an interruption in the flow of welding current, and means for independently controlling the magnitude of current flow in each direction through said exciting circuit of said shunt winding on said leading part of said split pole piece structure.

9. Arc welding apparatus comprising a generator capable of supplying welding current to a metal electrode and the work to be welded at current densities in said electrode sufficiently high to produce a self-regulating arc and having a rising volt-ampere characteristic substantially the same as the rising volt-ampere characteristic of said self-regulating arc, means for setting the voltage of said generator for operation on a volt-ampere characteristic corresponding to the volt-ampere characteristic of a self-regulating arc of desired length, means for setting the open circuit voltage of said generator for establishing an arc across a gap between the electrode and the work which is greater in length than the arc length capable of being established by said last-mentioned means, and means responsive to the flow of welding current for switching the control of said generator from said last-mentioned voltage setting means to said first-mentioned voltage setting means after a predetermined time delay.

10. Arc welding apparatus comprising a generator capable of supplying welding current to a metal electrode and the work to be welded at current densities in said electrode sufficiently high to produce a self-regulating arc and having a rising volt-ampere characteristic substantially the same as the rising volt-ampere characteristic of said self-regulating arc, means for setting the voltage of said generator for operation on a volt-ampere characteristic corresponding to the volt-ampere characteristic of a self-regulating arc of desired length, means for setting the open circuit voltage of said generator for establishing an arc across a gap between the electrode and the work which is greater in length than the arc length capable of being established by said last-mentioned means, and means responsive to the flow of welding current for switching the control of said generator from said last-mentioned voltage setting means to said first-mentioned voltage setting means after a predetermined time delay and for reversely switching the control of said generator from said first-mentioned voltage setting means to said second-mentioned voltage setting means after a predetermined time delay following an interruption of welding current flow.

References Cited in the file of this patent

UNITED STATES PATENTS

| | | |
|---|---|---|
| 1,346,164 | Bennett | July 13, 1920 |
| 1,966,232 | Asbaugh et al. | July 10, 1934 |
| 2,592,522 | Hendrick et al. | Apr. 8, 1952 |
| 2,680,181 | Tuthill et al. | June 1, 1954 |